(12) United States Patent
Beck

(10) Patent No.: US 9,117,376 B2
(45) Date of Patent: Aug. 25, 2015

(54) SYSTEM AND METHODS FOR SENSING FINGER POSITION IN DIGITAL MUSICAL INSTRUMENTS

(75) Inventor: Idan Beck, San Francisco, CA (US)

(73) Assignee: Incident Technologies, Inc., San Francisco, CA (US)

( * ) Notice: Subject to any disclaimer, the term of this patent is extended or adjusted under 35 U.S.C. 154(b) by 0 days.

(21) Appl. No.: 12/841,496

(22) Filed: Jul. 22, 2010

(65) Prior Publication Data

US 2012/0017748 A1 Jan. 26, 2012

(51) Int. Cl.
| | |
|---|---|
| G09B 15/00 | (2006.01) |
| G09B 15/02 | (2006.01) |
| G10H 1/00 | (2006.01) |
| G10H 1/34 | (2006.01) |

(52) U.S. Cl.
CPC .............. *G09B 15/00* (2013.01); *G09B 15/023* (2013.01); *G10H 1/0008* (2013.01); *G10H 1/0083* (2013.01); *G10H 1/342* (2013.01); *G10H 2210/086* (2013.01); *G10H 2220/015* (2013.01); *G10H 2230/015* (2013.01)

(58) Field of Classification Search
None
See application file for complete search history.

(56) References Cited

U.S. PATENT DOCUMENTS

| | | | | |
|---|---|---|---|---|
| 5,040,447 A | * | 8/1991 | Murata et al. | 84/612 |
| 5,557,057 A | * | 9/1996 | Starr | 84/617 |
| 5,777,251 A | * | 7/1998 | Hotta et al. | 84/609 |
| 6,162,981 A | * | 12/2000 | Newcomer et al. | 84/485 R |
| 6,846,980 B2 | * | 1/2005 | Okulov | 84/646 |
| 7,241,948 B2 | * | 7/2007 | Cummings | 84/731 |
| 7,521,619 B2 | * | 4/2009 | Salter | 84/477 R |
| 7,563,977 B2 | * | 7/2009 | Cummings | 84/735 |
| 7,598,449 B2 | * | 10/2009 | Sullivan | 84/646 |
| 7,799,986 B2 | * | 9/2010 | Ryle et al. | 84/737 |
| 7,897,866 B2 | * | 3/2011 | Sullivan | 84/724 |
| 8,003,877 B2 | * | 8/2011 | Elion | 84/646 |
| 8,022,288 B2 | * | 9/2011 | Sullivan | 84/615 |
| 2004/0187673 A1 | * | 9/2004 | Stevenson | 84/737 |
| 2005/0126373 A1 | * | 6/2005 | Ludwig | 84/661 |
| 2006/0196348 A1 | * | 9/2006 | Cummings | 84/731 |
| 2007/0227344 A1 | * | 10/2007 | Ryle et al. | 84/723 |
| 2007/0256540 A1 | * | 11/2007 | Salter | 84/485 R |
| 2008/0028920 A1 | * | 2/2008 | Sullivan | 84/722 |
| 2008/0047416 A1 | * | 2/2008 | Cummings | 84/731 |
| 2008/0271594 A1 | * | 11/2008 | Starr | 84/646 |
| 2009/0188371 A1 | * | 7/2009 | Chiu et al. | 84/314 R |
| 2009/0191932 A1 | * | 7/2009 | Chiu et al. | 463/7 |
| 2009/0314157 A1 | * | 12/2009 | Sullivan | 84/646 |
| 2010/0083807 A1 | * | 4/2010 | Sullivan | 84/315 |
| 2010/0313740 A1 | * | 12/2010 | Ryle et al. | 84/735 |
| 2012/0036982 A1 | * | 2/2012 | Sullivan | 84/724 |

* cited by examiner

*Primary Examiner* — Marlon Fletcher
(74) *Attorney, Agent, or Firm* — Novak Druce Connolly Bove + Quigg LLP

(57) ABSTRACT

Embodiments of the invention provide a digital musical instrument. The instrument comprises a fretboard and one or more strings extended over the fretboard. The instrument further includes an electric circuit for generating digital signals based on positions associated with contacts of the strings on the fretboard and a transceiver for transmitting the digital signals to a processing device that generates musical notation based on the digital signals.

11 Claims, 4 Drawing Sheets

SYSTEM AND METHODS FOR SENSING FINGER POSITION IN DIGITAL MUSICAL INSTRUMENTS

FIELD OF THE INVENTION

The invention relates to musical instruments and more specifically the invention relates to sensing of finger positions in digital musical instruments to generate musical notation.

BACKGROUND OF THE INVENTION

Various digital musical instruments are known for producing music. Examples of digital musical instruments include musical keyboards, guitar or guitar-like instruments and so forth. The digital musical instruments generate electric signals for producing musical notes. Such devices may be used in, for example, musical performances or for playing video games. The use of various symbols to depict musical notes in musical notation is well known. Further, in case of stringed instruments such as guitar or guitar-like instruments the musical notation may be presented in form of a tablature. The tablature indicates the finger positions on the instruments rather than musical pitches.

Generally, the guitar or guitar-like digital musical instruments are string-less and include mechanical keys to generate musical notes. For example, a published U.S. patent application Ser. No. 12/383,750 assigned to Clifford S. Elion, discloses an electronic fingerboard for a stringed instrument. The strings are either embossed on the neck of the guitar or are non-existent. Some techniques as described in U.S. Patent Publication No. assigned to Ser. No. 12/115,519 assigned to Starr Labs Inc., implements keys on the neck of the guitar and strings for note articulation. Therefore, such guitar-like instruments may have a body in the shape of a guitar, but do not provide strings. As a result, the detection of finger positions on the strings may not be possible.

An existing technique provides a stringed electronic musical instrument. For example, U.S. Pat. No. 7,563,977 assigned to iGuitar, Inc., describes a stringed guitar that can generate electric signals. However, the generation of musical information is not completely digital. For example, the musical instrument as described requires transducers to sense the vibration of the strings to generate analog signals. Further, the detection of finger position may not be possible.

Another existing technology as disclosed in U.S. Pat. No. 7,323,633 assigned to Optek Music Systems, Inc., describes transmission of finger positions of stringed instrument to another. However, the finger positions are determined based on the string data, such as frequency of strings, and not directly based on the position of the finger.

U.S. Patent Application No. 2010/0087254 describes the use of sensor to detect the finger position and uses it to generate a digital signal containing information as to the notes being played. Further, U.S. Pat. No. 6,162,981 assigned to Visual Strings, LLC, describes detection of strings that are in contact with a fingerboard and the position of touch. However, these techniques are limited to using the finger positions for detecting the note to be played.

Therefore, techniques are desirable that can efficiently detect the positions of the fingers of a user. Moreover, techniques are desirable to use the finger positions to generate musical notation.

SUMMARY

The present invention provides a digital musical instrument. The instrument comprises a fretboard and one or more strings extended over the fretboard. The instrument further includes an electric circuit for generating one or more digital signals based on one or more positions associated with contacts of the one or more strings on the fretboard and a transceiver for transmitting the digital signals to a processing device.

The present invention further provides a system for generating musical notation. The system comprising: a processing device; and a digital musical instrument connected to the processing device comprising: a fretboard; one or more strings extended over the fretboard; an electric circuit for generating one or more digital signals based on one or more positions associated with contacts of the one or more strings on the fretboard; and a transceiver for transmitting the digital signals to the processing device, wherein the processing device generates musical notation based on the digital signals.

The present invention further comprising a method for generating musical notation. The method comprising: generating, at a digital musical instrument, one or more digital signals based on one or more positions associated with contacts of one or more strings on a fretboard of the device; transmitting the digital signals to a processing device, wherein the processing device is connected to the instrument; and generating, at the processing device, the musical notation based on the one or more positions.

An aspect of the invention includes displaying the tablature on a graphical user interface.

Another aspect of the invention includes generating a hybrid tablature.

Yet another aspect of the invention includes storing the tablature for a later use.

BRIEF DESCRIPTION OF THE DRAWINGS

Figure 1:
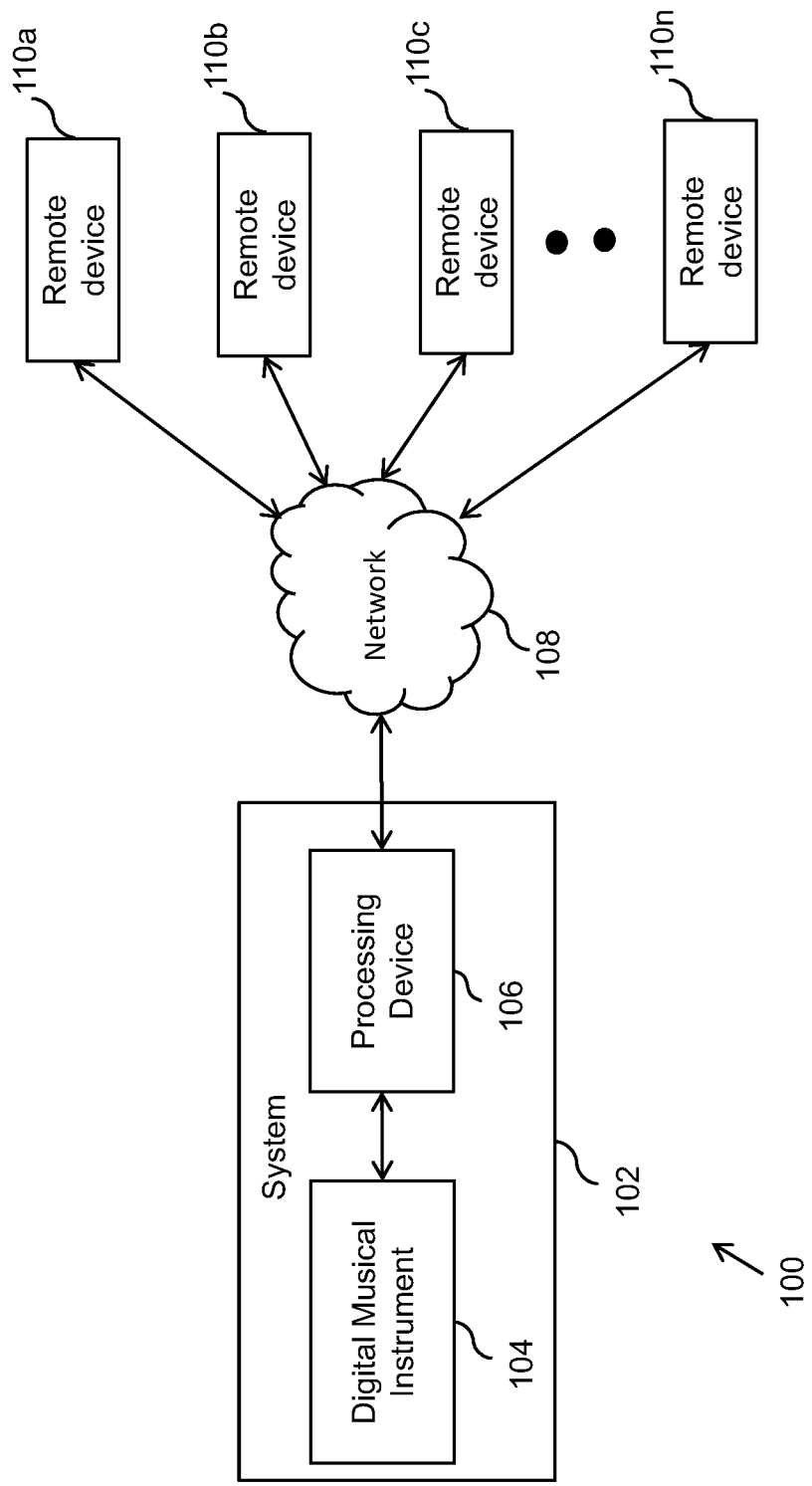
Figure 2:
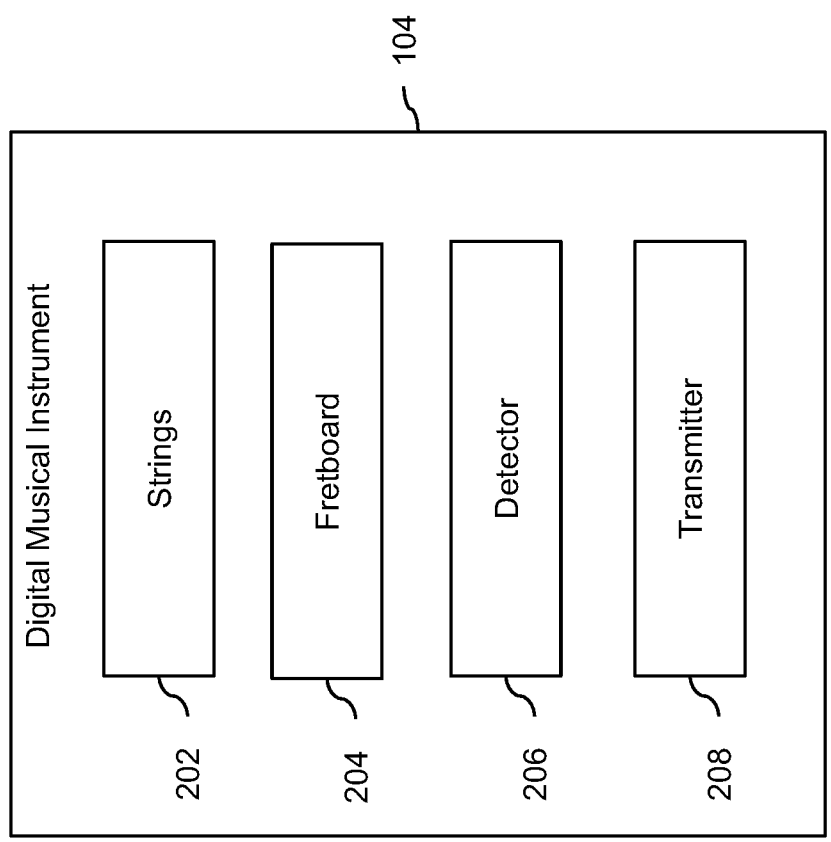
Figure 3:
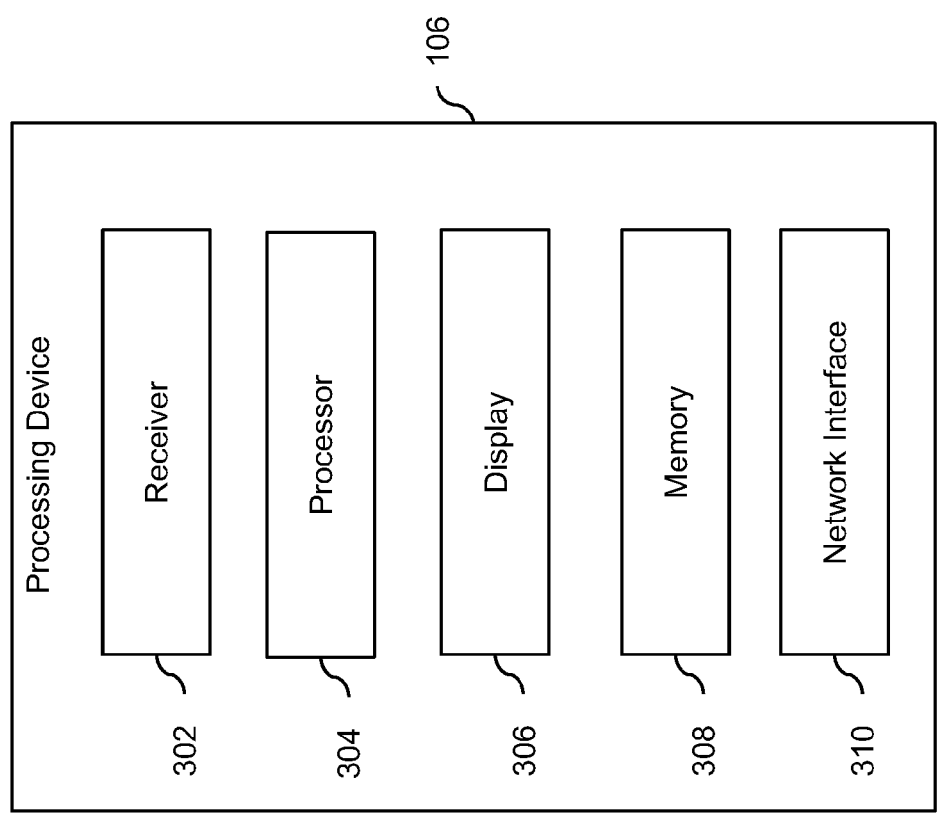
Figure 4:
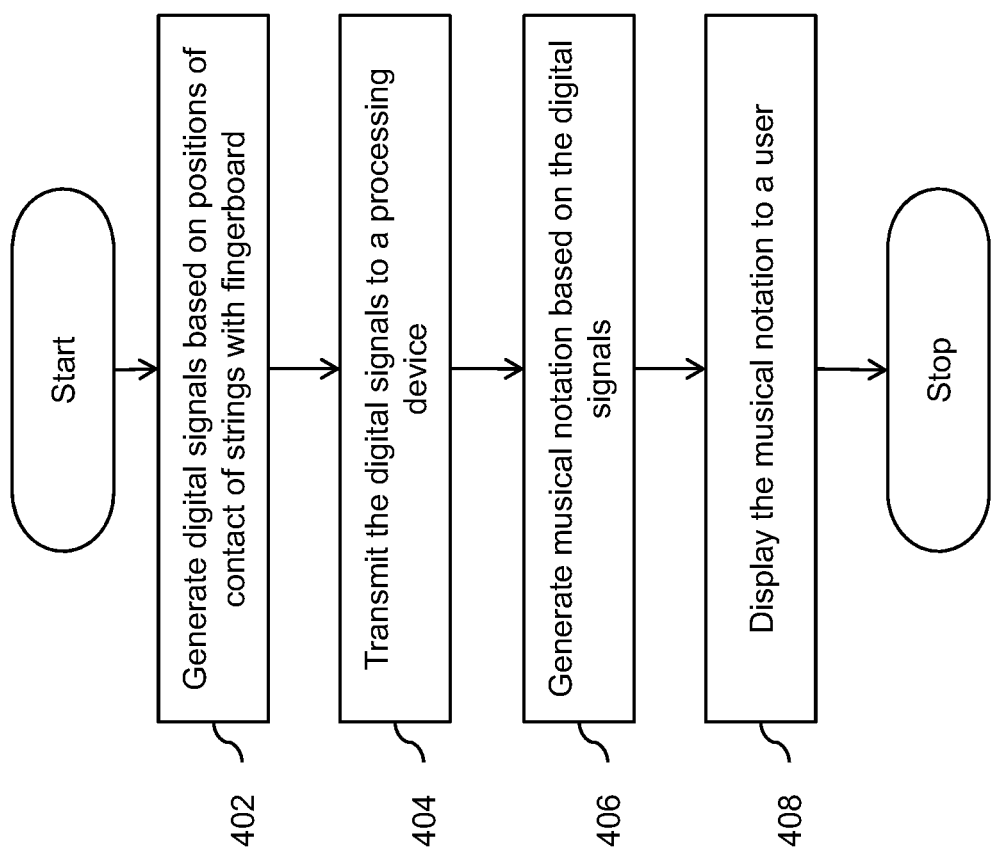

Having thus described the invention in general terms, reference will now be made to the accompanying drawings, which are not necessarily drawn to scale, and wherein:

FIG. 1 illustrates an environment where various embodiments of the present invention function, in accordance with an embodiment of the invention;

FIG. 2 illustrates elements of a digital musical instrument, in accordance with an embodiment of the invention;

FIG. 3 illustrates elements of a processing device in accordance with an embodiment of the invention; and FIG. 4 is a flowchart for generating musical notation in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1 an environment 100 is illustrated where various embodiments of the present invention function, in accordance with an embodiment of the invention. Environment 100 includes a system 102, a network 108 and remote devices 110a-n. A user may interact with a digital musical instrument 104 of system 102. Digital musical instrument 104 (here after referred to as instrument 104) includes a stringed musical instrument, such as but not limited to, a guitar, a lute, a vihuela, a violin, a cello and so forth. A user may interact with instrument 104 by using the strings to select or play a musical note. Further, instrument 104 is digital. Therefore, the inputs to and outputs from instrument 104 are digital. For example, digital signals are generated when the user presses the strings on a fretboard by using fingers or any other object. The digital signals may include information regarding the position of contact of the string with the fretboard. For example, the digital signals may include the position of the finger where a string is contacted with the fretboard. In an embodiment of the invention, the digital signals may include additional information such as the time and duration of the contact of the string with the fretboard.

The digital signals (here after referred to as signals) are then transmitted to processing device 106 of system 102. The signals may be transmitted over a wired connection and/or a wireless connection. Examples of wireless connection include but are not limited to a Radio Frequency (RF), Infrared, a Bluetooth connection and so forth. In an embodiment of the invention, the signals may be transmitted to processing device 106 over a computer network such as the Internet. Processing device 106 includes a device capable of processing the digital signals to generate musical notes and/or musical notation. For example, the musical notation includes tablature. Tablature is well known a form of musical notation that indicates the finger positions on a musical instrument rather than musical pitches.

Examples of processing device 106 include, but are not limited to, a computer, a laptop, a mobile phone, a smart phone, Digital Audio Workstation (DAW) and so forth. Further, processing device 106 may be connected to remote devices 110a-n through network 108. Examples of network 108 include, but are not limited to, a Local Area Network (LAN), a Wireless Local Area Network (WLAN), a Wide Area Network (WAN), the Internet and so forth. Processing device 106 may communicate with remote devices 110a-n for information such as musical notes, information about finger position and so forth. In an embodiment of the invention, device 110a-n may process the signals received from processing device 106 to generate musical notes and/or notation. Examples of remote devices 110a-n include, but are not limited to, a computer, a laptop, a mobile phone, a Smartphone, a server and so forth.

FIG. 2 illustrates exemplary components of instrument 104 for generating the signals. The user may interact with instrument 104 by using strings 202 extended over a fretboard 204. The user may press strings 202 on fretboard 204 by using fingers. Subsequently, a detector 206 detects the contact and generates digital signals. In an embodiment of the invention, the digital signals are generated based on the positions of the contacts when the user strums strings 202. For example, the user may press strings 202 on fretboard 204 with the fingers of the left hand and strum strings 202 with the right hand.

Detector 206 may include an electric circuit for detecting the contact. In an embodiment of the invention, strings 202 and fretboard 204 may be parts of the electric circuit. Therefore, when a string touches fretboard 204 at a particular position, the electric circuit is completed and a digital signal is generated based on the position. In another embodiment of the invention, detector 206 may include touch sensors for detecting the position of the contact. Examples of touch sensors include resistive touch sensors and capacitive touch sensors. In yet another embodiment of the invention, detector 206 may include sensors such light sensors, motion sensors, temperature sensors and so forth. A person skilled in the art will appreciate that various other types of components and circuits may be used to detect the position of contact.

The position of contact may be designated in the signals by the string touching fretboard 204 and the coordinates of the contact. Further, the signals may include information such as the time and duration of the contact. The signals are then transmitted to processing device 106 by transmitter 208 through a wired connection and/or a wireless connection. For example, transmitter 208 may transmit the signals though a Universal Serial Bus (USB), Wifi, Bluetooth, Infrared, Ethernet ports and so forth. Thereafter, processing device 106 may process the signals to generate musical notation.

With reference to FIG. 3, various elements of processing device 106 are illustrated in accordance with an embodiment of the invention. The signals sent from transmitter 208 are received by a receiver 302 of processing device 106. Subsequently, a processor 304 analyzes the signals to generate musical notation. As discussed above, musical notation may be in the form of tablature. Further, the tablature may be a standard tablature of a hybrid tablature. The hybrid tablature may include the finger position and time or duration information of the contact. For example, the hybrid tablature may be in the form of a piano roll.

The tablature may be displayed on a Graphical User Interface (GUI) of a display 306. In an embodiment of the invention, the positions are displayed on the GUI in real-time. For example, when at a particular moment the user presses the strings to contact the fretboard, the position is displayed on the GUI at the same moment in form of tablature. Display 306 may be integrated in processing device 106 or may be connected as an external device. In another embodiment of the invention, the tablature may be stored in a memory 308. Examples of memory 308 include but are not limited to a Random Access Memory (RAM), a Read Only Memory (ROM), a USB drive and so forth. Therefore, the user can view the tablature at a later moment based on the requirement. In yet another embodiment of the invention, the tablature may be simultaneously displayed in real time and stored in memory 308. Further, the user may navigate through the tablature from display 306 or print the tablature for a physical copy.

Processing device 106 may include a network interface 310 for communicating over network 108. Processing device 106 may communicate the tablature to remote devices 110a-n. Further, the signals may be communicated to remote devices 110a-n. In an embodiment of the invention, processing device 106 may display the finger positions and other information over a pre-stored tablature in memory 308 for comparison. As a result, the user can learn the finger placements based on the pre-stored tablature. Although processing device 106 is discussed as an external device to instrument 104, a person skilled in the art will appreciate that instrument 104 may include all or parts of the functionalities of processing device 106.

FIG. 4 is a flowchart for generating musical notation in accordance with an embodiment of the invention. The user may interact with instrument 104 by using strings 202 and fretboard 204. For example, the user may press a string with finger on fretboard 204. Subsequently, at step 402, digital signals are generated based on the positions associated with contacts of string on fretboard 204. The digital signals may include the information regarding the position of the fingers and the time and/or duration of the contact. Thereafter, the signals are transmitted to processing device 106, at step 404. The signals may be transmitted over a wired connection and/or a wireless connection.

At step 406, processing device 106 analyzes the signals to generate musical notation. The musical notation may include tablature indicating the finger positions. Subsequently, the tablature may be displayed to the user on display 306 at step 408. Further, the tablature may be stored in a memory 308 and then displayed on display 306. Moreover, processing device 106 may communicate the signals containing the position information and/or the tablature over network 108.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A digital musical instrument comprising:
a fretboard;
one or more strings extended over the fretboard;
a detector for generating one or more digital signals based on one or more positions associated with contact of the one or more strings on the fretboard, wherein at least one of the one or more digital signals comprises a duration of contact of one or more strings on the fretboard; and
a transmitter for transmitting the digital signals to a processing device, wherein the processing device is configured to:
generate musical notation based on the digital signals, wherein the musical notation comprises a hybrid notation of tablature and piano roll, and
present the musical notation on a graphical user interface.

2. The instrument of claim 1, wherein the digital signals are transmitted over at least one of a wired connection and a wireless connection.

3. The instrument of claim 1, wherein the processing device is configured to transmit the musical notation over a network.

4. A system for generating musical notation comprising:
a processing device; and
a digital musical instrument connected to the processing device comprising:
a fretboard;
one or more strings extended over the fretboard;
a detector for generating one or more digital signals based on one or more positions associated with contact of the one or more strings on the fretboard, wherein at least one of the one or more digital signals comprises a duration of contact of one or more strings on the fretboard;
a transmitter for transmitting the digital signals to the processing device, wherein the processing device generates musical notation based on the digital signals and displays the musical notation on a graphical user interface, and wherein the musical notation comprises a hybrid notation of tablature and piano roll.

5. The system of claim 4, wherein the digital signals are transmitted over at least one of a wired connection and a wireless connection.

6. The system of claim 4, wherein the processing device is configured to transmit the musical notation over a network.

7. The system of claim 4, wherein the processing device is configured to transmit the digital signals over a network.

8. A method for generating musical notation, comprising:
generating, at a digital musical instrument, one or more digital signals based on one or more positions associated with contact of one or more strings on a fretboard of the instrument, wherein at least one of the one or more digital signals comprises a duration of contact of one or more strings on the fretboard;
transmitting the digital signals to a processing device;
generating, at the processing device, musical notation based on the digital signals, wherein the musical notation comprises a hybrid notation of tablature and piano roll; and
displaying the musical notation on a graphical user interface at the processing device.

9. The method of claim 8, wherein the digital signals are transmitted through at least one of a wired connection and a wireless connection.

10. The method of claim 8, further comprising generating audio signals based on the digital signals at the processing device.

11. The method of claim 8, further comprising transmitting the musical notation over a network.

* * * * *